US011954716B2

(12) United States Patent
Hunter et al.

(10) Patent No.: US 11,954,716 B2
(45) Date of Patent: Apr. 9, 2024

(54) SYSTEM AND METHOD FOR DECENTRALIZED MARKETPLACES

(71) Applicant: JPMORGAN CHASE BANK, N.A., New York, NY (US)

(72) Inventors: John C. Hunter, Lithia, FL (US); Palka Patel, Jersey City, NJ (US); Suresh Shetty, Monmouth Junction, NJ (US); Sudhir Upadhyay, Edison, NJ (US); Tulasi D. Movva, Trumbull, CT (US); Vinay Somashekar, Jersey City, NJ (US); Ramesh Babu Anandhan, New York, NY (US); Thomas Eapen, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 289 days.

(21) Appl. No.: 17/329,754

(22) Filed: May 25, 2021

(65) Prior Publication Data
US 2021/0374819 A1  Dec. 2, 2021

Related U.S. Application Data

(60) Provisional application No. 63/030,161, filed on May 26, 2020.

(51) Int. Cl.
 *G06F 21/62* (2013.01)
 *G06Q 20/22* (2012.01)
 *G06Q 30/0601* (2023.01)

(52) U.S. Cl.
 CPC ........ *G06Q 30/0619* (2013.01); *G06F 21/62* (2013.01); *G06Q 20/223* (2013.01); *G06Q 30/0601* (2013.01)

(58) Field of Classification Search
 CPC .......... G06Q 30/0619; G06Q 30/0601; G06Q 30/06; G06Q 20/223; G06F 21/62; G06F 8/60
 See application file for complete search history.

(56) References Cited

U.S. PATENT DOCUMENTS

| 2008/0216106 A1* | 9/2008 | Maxwell | G06Q 20/12 725/1 |
| 2011/0078041 A1* | 3/2011 | Barker | H04L 63/08 705/26.25 |

(Continued)

FOREIGN PATENT DOCUMENTS

WO    2019006177    1/2019

OTHER PUBLICATIONS

International Search Report, dated Sep. 13, 2021, from corresponding International Application No. PCT/US2021034341.

(Continued)

*Primary Examiner* — Han Yang
(74) *Attorney, Agent, or Firm* — GREENBERG TRAURIG LLP

(57) ABSTRACT

A method for distributed application distribution may include: (1) receiving, at a first decentralized marketplace instance in a distributed ledger network and from a first node of the plurality of nodes, the first node associated with a distributed application creator, a distributed application; (2) making available, by the first decentralized marketplace instance, the distributed application to decentralized marketplace instances, wherein the first node is configured to provide the distributed application to a second node, the second node associated with a distributed application collaborator; (3) receiving, at a second decentralized marketplace instance and from the second node, a modified version of the distributed application; and (4) making available, by the second decentralized marketplace instance, the modified (Continued)

version of the distributed application to the decentralized marketplace instances, wherein the second node is configured to provide the distributed application to a third node, the third node associated with a distributed application consumer.

20 Claims, 4 Drawing Sheets

(56) References Cited

U.S. PATENT DOCUMENTS

| | | | |
|---|---|---|---|
| 2014/0280585 A1* | 9/2014 | Smith ................... | H04W 84/18 709/204 |
| 2019/0004789 A1* | 1/2019 | Mills ..................... | H04L 9/3239 |
| 2023/0179654 A1* | 6/2023 | Anandhan ............... | H04L 67/55 709/217 |

OTHER PUBLICATIONS

Written Opinion of the International Searching Authority, dated Sep. 13, 2021, from corresponding International Application No. PCT/US2021034341.

* cited by examiner

SYSTEM AND METHOD FOR DECENTRALIZED MARKETPLACES

RELATED APPLICATIONS

This application claims priority to, and the benefit of, U.S. Provisional Patent Application Ser. No. 63/030,161, filed May 26, 2020, the disclosure of which is hereby incorporated, by reference, in its entirety.

BACKGROUND OF THE INVENTION

1. Field of the Invention

Embodiments relate generally to systems and methods for decentralized marketplaces.

2. Description of the Related Art

A traditional on-line marketplace, such as an "App Store", is centralized in that there is a single, centralized marketplace that all users access. For example, as shown in FIG. 1, an Application Developer ("App Developer") develops and submits applications to the App Store (typically after certification and verification), and the App Store makes the applications available on to users (e.g., retail consumers, business consumers, etc.) on its servers. The consumer may then purchase the application from the central server, and the App Store may deploy the application to the consumer's device. This is primarily a business to consumer (B2C) marketplace. In this type of marketplace, both the App Store and the App Developer monetize the application.

Examples of such App Stores include the Apple App Store, Googly Play, and App Stores that are internal to an organization.

SUMMARY OF THE INVENTION

Systems and methods for decentralized marketplaces are disclosed. In one embodiment, a method for distributed application distribution may include: (1) receiving, at a first decentralized marketplace instance in a distributed ledger network comprising a plurality of nodes, and from a first node of the plurality of nodes, the first node associated with a distributed application creator, a distributed application; (2) making available, by the first decentralized marketplace instance, the distributed application to decentralized marketplace instances at the plurality of nodes in the distributed ledger network, wherein the first node is configured to provide the distributed application to a second node in the distributed ledger network, the second node associated with a distributed application collaborator; (3) receiving, at a second decentralized marketplace instance and from the second node, a modified version of the distributed application; and (4) making available, by the second decentralized marketplace instance, the modified version of the distributed application to the decentralized marketplace instances at the plurality of nodes in the distributed ledger network, wherein the second node is configured to provide the distributed application to a third node in the distributed ledger network, the third node associated with a distributed application consumer.

In one embodiment, the distributed ledger network may include a peer-to-peer network.

In one embodiment, the distributed ledger network may be a permissioned network.

In one embodiment, the decentralized marketplace instances may be provided as applications at each node in the distributed ledger network.

In one embodiment, the modified version of the distributed application may interact with a service provided by the first node or the second node.

In one embodiment, the step of making available, by the first decentralized marketplace instance, the distributed application to decentralized marketplace instances at the plurality of nodes in the distributed ledger network may include notifying, by the first decentralized marketplace instance, the decentralized marketplace instances at the plurality of nodes in the distributed ledger network of availability of the distributed application.

In one embodiment, the distributed application creator may directly pay the distributed application creator for the distributed application. The distributed application consumer may directly pay the distributed application creator for the distributed application and the distributed application collaborator for the modified distributed application.

According to another embodiment, a decentralized application marketplace may include: a distributed ledger network comprising a plurality of nodes, each node executing a decentralized marketplace instance; a distributed application creator associated with a first node of the plurality of nodes; a distributed application collaborator associated with a second node of the plurality of nodes; and a distributed application consumer associated with a third node of the plurality of nodes. A first decentralized marketplace instance at the first node may receive a distributed application from the distributed application creator and may make the distributed application available to decentralized marketplace instances at the plurality of nodes in the distributed ledger network. The first node may provide the distributed application to the second node in the distributed ledger network. A second decentralized marketplace instance may receive a modified version of the distributed application from the distributed application collaborator and may make the modified distributed application available to decentralized marketplace instances at the plurality of nodes in the distributed ledger network. The second node may provide the modified distributed application to the third node in the distributed ledger network.

In one embodiment, the distributed ledger network may include a peer-to-peer network.

In one embodiment, the distributed ledger network may be a permissioned network.

In one embodiment, the decentralized marketplace instances may be provided as applications at each node in the distributed ledger network.

In one embodiment, the modified version of the distributed application may interact with a service provided by the first node or the second node.

In one embodiment, the distributed application creator may directly pay the distributed application creator for the distributed application. The distributed application consumer may directly pay the distributed application creator for the distributed application and the distributed application collaborator for the modified distributed application.

According to another embodiment, a method for distributed application use in a distributed ledger network may include: (1) receiving, by a first instance of a distributed application at a first node in a distributed ledger network comprising a plurality of nodes, a query for a service or data from a second instance of the distributed ledger at a second node in the distributed ledger network; (2) submitting, by the first instance of a distributed application, the query to the second instance of the distributed application, wherein the second instance of the distributed application may be configured to execute the query; (3) receiving, by the first instance of a distributed application, a result of the query; and (4) outputting, by the first instance of the distributed application, the result.

In one embodiment, the query may include permission for the second node to execute the query.

In one embodiment, the query may be communicated to a plurality of distributed application instances in the distributed ledger network.

In one embodiment, the distributed ledger network may include a permissioned network.

In one embodiment, a first entity associated with the first instance of the distributed application may directly pay a second entity associated with the second instance of the distributed application.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are generally directed to decentralized marketplace that does not involve a centralized server to distribute applications and services.

In embodiments, a decentralized eco-system is a collection of participants that are connected via peer-to-peer (P2P) protocol. Each participant is an equal and active consumer, contributor and collaborator ("3C") of services on the network. The growth of the network has a network effect for contributors on the network.

Figure 1:
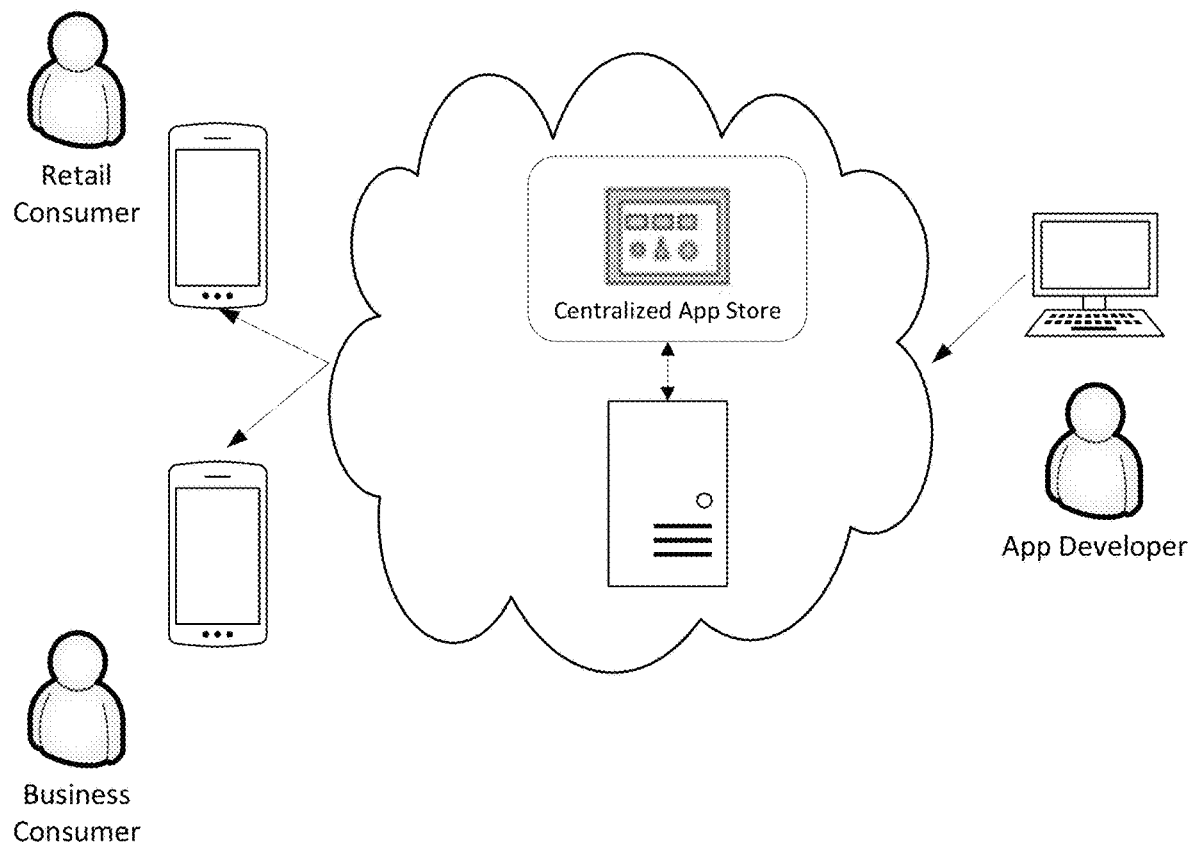
FIG. 1 depicts a known centralized marketplace.
Figure 2:
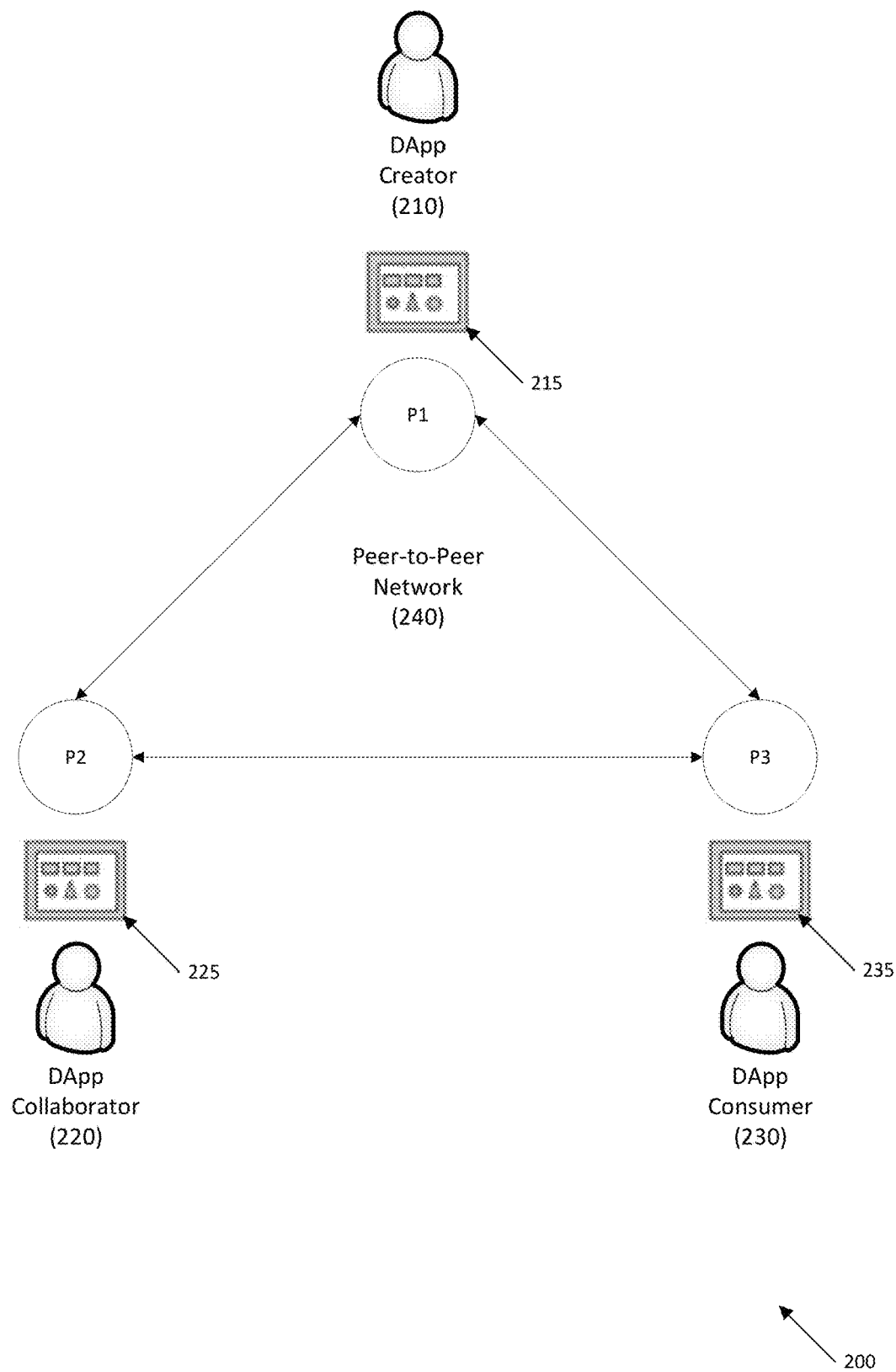
FIG. 2 illustrates a decentralized marketplace according to an embodiment.

Referring to FIG. 2, a decentralized marketplace is disclosed according to one embodiment. In decentralized marketplace 200, a plurality of participants (e.g., Distributed Application ("DApp") creator 210, DApp Collaborator 220, DApp Consumer 230) may participate in peer-to-peer network 240 as nodes (e.g., P1, P2, P3, etc.). The participants may communicate directly with each other without requiring the involvement of other participants, a central server, gatekeeper, etc.

Although only three participants (e.g., DApp creator 210, DApp collaborator 220, and DApp consumer 230) are illustrated in FIG. 2, it should be recognized that any number of DApp creators, collaborators, and consumers may participate in peer-to-peer network 240 as is necessary and/or desired.

Peer-to-peer network 240 may be a permissioned network, and the participants may permission other peers to interact with any service or DApp that they use in the network.

In one embodiment, peer-to-peer network 240 may be a distributed ledger network, such as a blockchain based network. An example of such a network is disclosed in U.S. patent application Ser. No. 16/015,709, filed Jun. 22, 2018, the disclosure of which is hereby incorporated, by reference, in its entirety.

In one embodiment, each node (e.g., P1, P2, P3, etc.) may be provided with a decentralized marketplace (e.g., decentralized marketplace instances 215, 225, 235) where a participant may request a DApp. In one embodiment, the decentralized marketplace (e.g., 215, 225, 235) presented on each node P1, P2, P3 may be the same; in another embodiment, it may differ based on the role of the participant.

In one embodiment, the DApp may be an application, or it may be a service. The services may be localized to the participant in the network; thus, the service is a decentralized service that may be independent of DApp creator 210. The participants do not need to get permission from, or inform, the DApp creator 210 of the DApp to provide the DApp service to any peers.

For example, the DApp may be created by DApp creator 210 and DApp collaborator 220. DApp consumer 230 may use the DApp in peer-to-peer network 240. Different participants may play different roles within the network.

The DApp may be deployed across peer-to-peer network 240 across all permissioned participant nodes (e.g., P1, P2, P3). Each participant may then have full visibility of the application and any changes. Once the DApp is distributed, it may be updated as DApp creator 210 or DApp collaborator 220 makes changes. The DApps for different participants may communicate directly with each other. For example, a DApp executed by DApp consumer 230 may communicate with a service provided by DApp collaborator 220 and/or DApp creator 210.

Figure 3:
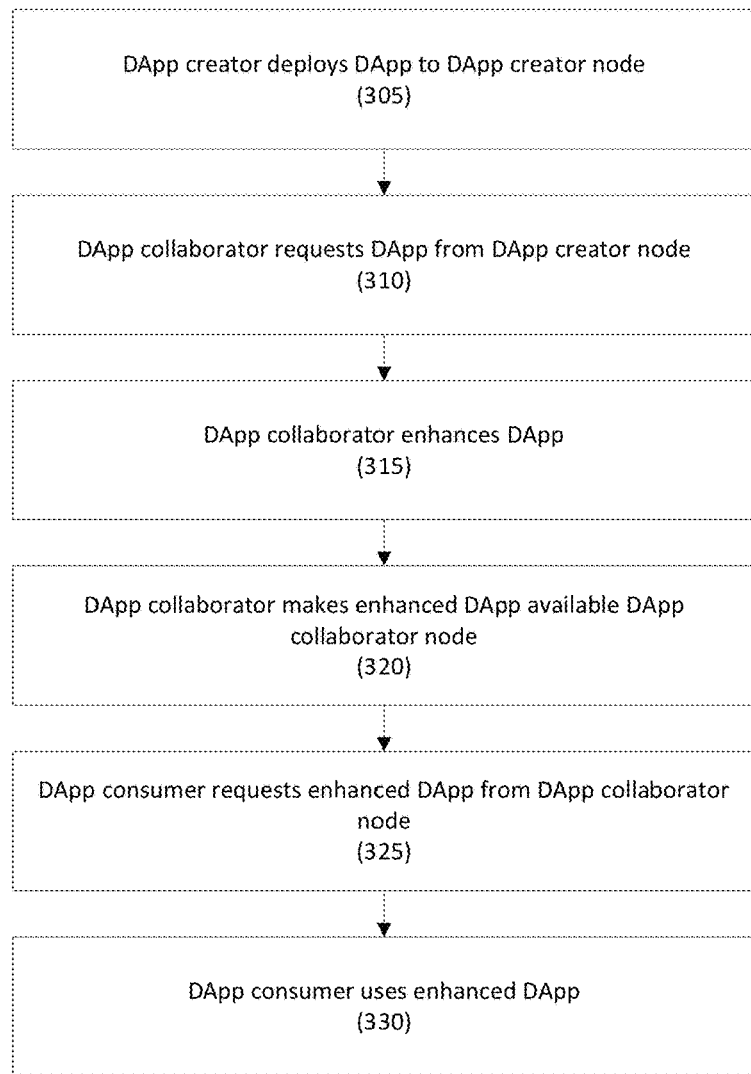
FIG. 3 depicts a method for distributed application distribution according to an embodiment.

Referring to FIG. 3, a method for distributed application distribution is provided according to one embodiment.

In step 305, a DApp creator may deploy a DApp to its node in a peer-to-peer network. In one embodiment, once deployed, a decentralized marketplace at the DApp creator's node may inform other decentralized marketplaces at other nodes in the peer-to-peer network that the DApp is available. In one embodiment, pricing and other information for the DApp may be provided as is necessary and/or desired.

In step 310, a DApp collaborator may request the DApp using the decentralized marketplace on its node. The DApp collaborator may provide payment as is necessary and/or desired.

The DApp collaborator may then download the DApp to its electronic device for use or enhancement.

In step 315, the DApp collaborator may enhance the DApp. For example, the DApp collaborator may add, delete, or modify features in the DApp.

In step 320, the DApp collaborator may deploy the enhanced DApp to its node in a peer-to-peer network. In one embodiment, once deployed, the decentralized marketplace at the DApp collaborator's node may inform other decentralized marketplaces at other nodes in the peer-to-peer network that the enhanced DApp is available. In one embodiment, pricing and other information for the DApp may be provided as is necessary and/or desired.

In step 325, a DApp consumer may request the enhanced DApp using the decentralized marketplace on its node. The DApp consumer may provide payment as is necessary and/or desired. For example, the DApp consumer may pay the DApp creator that provided the DApp and/or the DApp collaborator that enhanced the DApp.

In step 330, the DApp consumer may then download the enhanced DApp to its electronic device for use.

Figure 4:
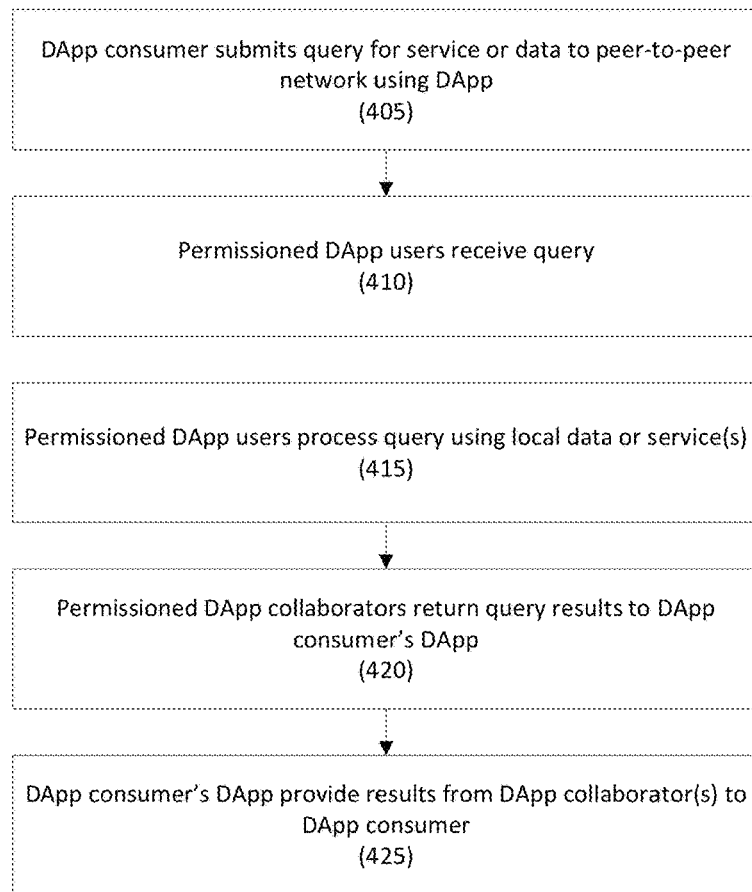
FIG. 4 depicts a method for distributed application use in a peer-to-peer network according to an embodiment.

Referring to FIG. 4, a method for distributed application use in a peer-to-peer network is provided according to an embodiment.

In step 405, a DApp consumer may submit a query to participants in a peer-to-peer network using its DApp. The query may be for a service, such as address confirmation, data, such as information, etc.

In one embodiment, the DApp consumer may identify other DApp users (e.g., the DApp creator, DApp collaborator, and/or other DApp consumers) to receive the query. For example, the DApp consumer may identify the other DApp users to receive the query specifically (e.g., by node, by entity name, by DApp identifier, etc.). As another example, the DApp consumer may identity the DApp users to receive the query based on the DApp user's roles, locations, etc. As another example, the DApp consumer may broadcast the query to all nodes executing the DApp. Any suitable manner of identifying the recipients for the query may be used as is necessary and/or desired.

In step 410, the DApp users that were identified as recipients may receive the query from the DApp consumer's DApp.

In step 415, the DApp user(s) may process the query using local data or service(s). For example, one or more DApp user may run the query against its data, may execute the query using its services, etc.

In step 420, the permissioned DApp user(s) may return the results of the query to the DApp consumer's DApp.

In step 425, the DApp consumer's DApp may provide the results to the DApp consumer. In one embodiment, the DApp may provider payment to the responding DApp user(s) as is necessary and/or desired.

In one embodiment, the terms for payment may be embedded within the DApp; in another embodiment, the terms for payment may be negotiated by the DApp consumer and the responding DApp user(s).

In one embodiment, payments may be provided directly to the DApp creator, to the DApp collaborator, etc. in a decentralized manner. In another embodiment, billing may be centralized the peer-to-peer network tracking purchases of DApps, usage of DApps, use of services, etc. and may further facilitate consolidated billing. The peer-to-peer network may then distribute payment to the DApp creators and/or DApp collaborators, minus any fee for posting the DApp to the decentralized marketplace.

In one embodiment, a hybrid billing and payment mechanism may be used, where the billing may be centralized, and the payments may be decentralized, so that the DApp consumer may pay the DApp collaborator and/or DApp creator directly.

In one embodiment, payment may be made using digital currency involving electronic wallets maintained on the peer-to-peer network. Invoices may further be written to the peer-to-peer network, and payment activity may be tracked using the peer-to-peer network. In one embodiment, a smart contract may specify the payment allocations (e.g., percentage to the DApp creator, a percentage to the peer-to-peer network, etc.).

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention. The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for distributed application distribution, comprising:

receiving, at a first decentralized marketplace instance in a distributed ledger network comprising a plurality of nodes, and from a first node of the plurality of nodes, the first node associated with a distributed application creator, a distributed application;

making available, by the first decentralized marketplace instance, the distributed application to decentralized marketplace instances at the plurality of nodes in the distributed ledger network, wherein the first node is configured to provide the distributed application to a second node in the distributed ledger network, the second node associated with a distributed application collaborator;

receiving, at a second decentralized marketplace instance and from the second node, a modified version of the distributed application; and making available, by the second decentralized marketplace instance, the modified version of the distributed application to the decentralized marketplace instances at the plurality of nodes in the distributed ledger network, wherein the second node is configured to provide the distributed application to a third node in the distributed ledger network, the third node associated with a distributed application consumer.

2. The method of claim 1, wherein the distributed ledger network comprises a peer-to-peer network.

3. The method of claim 1, wherein the distributed ledger network is a permissioned network.

4. The method of claim 1, wherein the decentralized marketplace instances are provided as applications at each node in the distributed ledger network.

5. The method of claim 1, wherein the modified version of the distributed application interacts with a service provided by the first node or the second node.

6. The method of claim 1, wherein the step of making available, by the first decentralized marketplace instance, the distributed application to decentralized marketplace instances at the plurality of nodes in the distributed ledger network comprises notifying, by the first decentralized marketplace instance, the decentralized marketplace instances at the plurality of nodes in the distributed ledger network of availability of the distributed application.

7. The method of claim 1, wherein the distributed application consumer directly pays the distributed application creator for the distributed application.

8. The method of claim 1, wherein the distributed application consumer directly pays the distributed application creator for the distributed application and the distributed application collaborator for the modified version of the distributed application.

9. A system, comprising:

a distributed ledger network comprising a plurality of nodes, each node executing a decentralized marketplace instance;

a distributed application creator associated with a first node of the plurality of nodes;

a distributed application collaborator associated with a second node of the plurality of nodes; and a distributed application consumer associated with a third node of the plurality of nodes;

wherein:

a first decentralized marketplace instance at the first node receives a distributed application from the distributed application creator;

the first decentralized marketplace instance makes the distributed application available to decentralized marketplace instances at the plurality of nodes in the distributed ledger network;

the first node provides the distributed application to the second node in the distributed ledger network;

a second decentralized marketplace instance receives a modified version of the distributed application from the distributed application collaborator;

the second decentralized marketplace instance makes the modified version of the distributed application available to decentralized marketplace instances at the plurality of nodes in the distributed ledger network; and the second node provides the modified version of the distributed application to the third node in the distributed ledger network.

10. The system of claim 9, wherein the distributed ledger network comprises a peer-to-peer network.

11. The system of claim 9, wherein the distributed ledger network is a permissioned network.

12. The system of claim 9, wherein the decentralized marketplace instances are provided as applications at each node in the distributed ledger network.

13. The system of claim 9, wherein the modified version of the distributed application interacts with a service provided by the first node or the second node.

14. The system of claim 9, wherein the distributed application consumer directly pays the distributed application creator for the distributed application.

15. The system of claim 9, wherein the distributed application consumer directly pays the distributed application creator for the distributed application and the distributed application collaborator for the modified version of the distributed application.

16. A method for distributed application use in a distributed ledger network, comprising:

receiving, by a first instance of a distributed application at a first node in the distributed ledger network comprising a plurality of nodes, a query for a service or data from a second instance of the distributed application at a second node in the distributed ledger network;

submitting, by the first instance of the distributed application, the query to the second instance of the distributed application, wherein the second instance of the distributed application is configured to execute the query;

receiving, by the first instance of the distributed application, a result of the query; and outputting, by the first instance of the distributed application, the result.

17. The method of claim 16, wherein the query comprises permission for the second node to execute the query.

18. The method of claim 16, wherein the query is communicated to a plurality of distributed application instances in the distributed ledger network.

19. The method of claim 16, wherein the distributed ledger network comprises a permissioned network.

20. The method of claim 16, wherein a first entity associated with the first instance of the distributed application directly pays a second entity associated with the second instance of the distributed application.

* * * * *